(12) United States Patent
Standish et al.

(10) Patent No.: US 9,130,318 B2
(45) Date of Patent: Sep. 8, 2015

(54) LOCALIZED READING OF RFID TAGS LOCATED ON MULTIPLE SIDES OF A PORT FROM A SINGLE SIDE USING RFID COUPLING CIRCUIT AND PORTABLE RFID READER

(71) Applicant: Tyco Electronics UK Ltd., Wiltshire (GB)

(72) Inventors: Ian Miles Standish, North Wales (GB); Stephen Lambourn, Wiltshire (GB); David Mather, Cheshire (GB)

(73) Assignee: Tyco Electronics UK Ltd., Wiltshire (GB)

( * ) Notice: Subject to any disclaimer, the term of this patent is extended or adjusted under 35 U.S.C. 154(b) by 26 days.

(21) Appl. No.: 14/080,535

(22) Filed: Nov. 14, 2013

(65) Prior Publication Data

US 2014/0141649 A1    May 22, 2014

Related U.S. Application Data

(60) Provisional application No. 61/727,450, filed on Nov. 16, 2012.

(51) Int. Cl.
*H01R 13/44* (2006.01)
*H01R 13/703* (2006.01)
(Continued)

(52) U.S. Cl.
CPC .......... *H01R 13/7036* (2013.01); *H01R 4/4863* (2013.01); *H01R 13/08* (2013.01); *H01R 13/2421* (2013.01); *H01R 13/44* (2013.01); *H01R 13/52* (2013.01); *H01R 13/521* (2013.01); *H01R 13/641* (2013.01); *H01R 13/70* (2013.01)

(58) Field of Classification Search
USPC ....................................... 439/620.01–620.34
See application file for complete search history.

(56) References Cited

U.S. PATENT DOCUMENTS 5,270,717 A    12/1993    Schuermann
5,394,503 A    2/1995    Dietz, Jr. et al.
(Continued)

FOREIGN PATENT DOCUMENTS

CA    2499803    4/2004
DE    10244304    3/2004
(Continued)

OTHER PUBLICATIONS

European Patent Office, "International Search Report from PCT Application No. PCT/EP2013/073862 mailed Mar. 3, 2014", "from PCT Counterpart of U.S. Appl. No. 14/080,535", filed Mar. 3, 2014, pp. 1-6, Published in: WO.
(Continued)

*Primary Examiner* — Chandrika Prasad
(74) *Attorney, Agent, or Firm* — Fogg & Powers LLC

(57) ABSTRACT

One embodiment is directed to an adapter comprising a coupling circuit configured so that a portable RFID reader can be positioned near a first part of the coupling circuit associated with a first side of the adapter in order to perform a localized read of both an RFID tag attached to a first connector inserted into a first jack of the adapter and an RFID tag attached to a second connector inserted into a second jack of the adapter, wherein the coupling circuit is used to enhance a read range of the portable RFID reader when performing the localized read. These embodiments can be used in the outside plant of a telecommunications network. Other embodiments are disclosed.

15 Claims, 8 Drawing Sheets

(51) Int. Cl.
*H01R 4/48* (2006.01)
*H01R 13/08* (2006.01)
*H01R 13/24* (2006.01)
*H01R 13/52* (2006.01)
*H01R 13/641* (2006.01)
*H01R 13/70* (2006.01)

(56) References Cited

U.S. PATENT DOCUMENTS

| | | |
|---|---|---|
| 5,483,467 A | 1/1996 | Krupka |
| 5,821,510 A | 10/1998 | Cohen et al. |
| 5,910,776 A | 6/1999 | Black |
| 6,002,331 A | 12/1999 | Laor |
| 6,222,908 B1 | 4/2001 | Bartolutti et al. |
| 6,378,111 B1 | 4/2002 | Brenner et al. |
| 6,499,861 B1 | 12/2002 | German et al. |
| 6,522,737 B1 | 2/2003 | Bartolutti et al. |
| 6,626,697 B1 | 9/2003 | Martin et al. |
| 6,777,617 B2 | 8/2004 | Berglund et al. |
| 6,784,802 B1 | 8/2004 | Stanescu |
| 6,808,116 B1 | 10/2004 | Eslambolchi et al. |
| 6,847,856 B1 | 1/2005 | Bohannon |
| 7,027,704 B2 | 4/2006 | Frohlich et al. |
| 7,028,087 B2 | 4/2006 | Caveney |
| 7,046,899 B2 | 5/2006 | Colombo et al. |
| 7,160,143 B2 | 1/2007 | David et al. |
| 7,165,728 B2 | 1/2007 | Durrant et al. |
| 7,170,393 B2 | 1/2007 | Martin |
| 7,197,214 B2 | 3/2007 | Elkins, II et al. |
| 7,246,746 B2 | 7/2007 | McNamara |
| 7,294,026 B1 | 11/2007 | Donnell et al. |
| 7,315,681 B2 | 1/2008 | Kewitsch |
| 7,349,605 B2 | 3/2008 | Noonan et al. |
| 7,406,231 B1 | 7/2008 | Beck et al. |
| 7,436,310 B2 | 10/2008 | Flaster et al. |
| 7,458,517 B2 | 12/2008 | Durrant et al. |
| 7,461,849 B2 | 12/2008 | Robbins et al. |
| 7,468,669 B1 | 12/2008 | Beck et al. |
| 7,489,849 B2 | 2/2009 | Reagan et al. |
| 7,534,137 B2 | 5/2009 | Caveney et al. |
| 7,547,150 B2 | 6/2009 | Downie et al. |
| 7,556,271 B2 | 7/2009 | Robbins et al. |
| 7,565,055 B2 | 7/2009 | Lu et al. |
| 7,568,936 B2 * | 8/2009 | Shigemi et al. ............ 439/374 |
| 7,586,840 B2 | 9/2009 | Karam |
| 7,605,707 B2 | 10/2009 | German et al. |
| 7,611,157 B2 | 11/2009 | Robbins et al. |
| 7,627,222 B2 | 12/2009 | Reagan et al. |
| 7,628,409 B2 | 12/2009 | Robbins et al. |
| 7,629,893 B2 | 12/2009 | Horn |
| 7,667,574 B2 | 2/2010 | Downie et al. |
| 7,680,388 B2 | 3/2010 | Reagan et al. |
| 7,737,856 B2 | 6/2010 | Horn |
| 7,740,234 B2 | 6/2010 | Robbins et al. |
| 7,760,094 B1 * | 7/2010 | Kozischek et al. ........ 340/572.1 |
| 7,772,975 B2 | 8/2010 | Downie et al. |
| 7,781,910 B2 | 8/2010 | Donnell et al. |
| 7,782,202 B2 | 8/2010 | Downie et al. |
| 7,787,823 B2 | 8/2010 | George et al. |
| 7,805,044 B2 | 9/2010 | Reagan et al. |
| 7,806,333 B1 | 10/2010 | McReynolds et al. |
| 7,848,654 B2 | 12/2010 | Sauer et al. |
| 7,855,697 B2 | 12/2010 | Chamarti et al. |
| 7,856,166 B2 | 12/2010 | Biribuze et al. |
| 7,920,764 B2 | 4/2011 | Kewitsch |
| 7,940,787 B2 | 5/2011 | Karam |
| 7,965,186 B2 | 6/2011 | Downie et al. |
| 7,995,731 B2 | 8/2011 | Vernick |
| 8,041,178 B2 | 10/2011 | Lu et al. |
| 8,044,804 B1 | 10/2011 | McReynolds |
| 8,050,939 B2 | 11/2011 | Graves et al. |
| 8,068,715 B2 | 11/2011 | Kewitsch |
| 8,075,348 B2 | 12/2011 | Mei et al. |
| 8,089,340 B2 | 1/2012 | Cochran et al. |
| 8,092,249 B2 | 1/2012 | German et al. |
| 8,094,679 B2 | 1/2012 | King |
| 8,116,434 B2 | 2/2012 | German et al. |
| 8,138,925 B2 | 3/2012 | Downie et al. |
| 8,157,227 B2 | 4/2012 | Kewitsch |
| 8,172,468 B2 | 5/2012 | Jones et al. |
| 8,181,229 B2 | 5/2012 | Macauley |
| 8,184,525 B2 | 5/2012 | Karam |
| 8,203,450 B2 | 6/2012 | German et al. |
| 8,233,804 B2 | 7/2012 | Aguren |
| 8,248,208 B2 | 8/2012 | Renfro, Jr. |
| 8,260,132 B2 | 9/2012 | Aguren |
| 8,264,355 B2 | 9/2012 | Kozischek et al. |
| 8,264,366 B2 | 9/2012 | Chamarti et al. |
| 8,410,909 B2 * | 4/2013 | de Jong ................. 340/10.4 |
| 8,556,659 B1 * | 10/2013 | Rothkopf et al. ........ 439/620.21 |
| 9,011,183 B2 * | 4/2015 | Rothkopf et al. ........... 439/679 |
| 2001/0015377 A1 | 8/2001 | Vassura et al. |
| 2001/0024360 A1 | 9/2001 | Hirata et al. |
| 2004/0117515 A1 | 6/2004 | Sago et al. |
| 2005/0215119 A1 | 9/2005 | Kaneko |
| 2007/0146138 A1 | 6/2007 | Phipps et al. |
| 2007/0222602 A1 | 9/2007 | Luo et al. |
| 2007/0222603 A1 | 9/2007 | Lai et al. |
| 2008/0238679 A1 | 10/2008 | Rofougaran et al. |
| 2008/0266063 A1 | 10/2008 | James |
| 2009/0015383 A1 | 1/2009 | Stewart |
| 2009/0108995 A1 | 4/2009 | Tucker et al. |
| 2009/0166404 A1 | 7/2009 | German et al. |
| 2009/0249444 A1 | 10/2009 | Macauley |
| 2010/0210135 A1 | 8/2010 | German et al. |
| 2011/0227705 A1 | 9/2011 | Khozyainov |
| 2012/0007717 A1 | 1/2012 | Jong |
| 2012/0126949 A1 | 5/2012 | Downie et al. |
| 2012/0326842 A1 | 12/2012 | Grinberg |
| 2013/0078848 A1 | 3/2013 | Kummetz |
| 2013/0205579 A1 | 8/2013 | Mather et al. |
| 2013/0207782 A1 | 8/2013 | Mather et al. |
| 2013/0256413 A1 * | 10/2013 | Standish et al. ............ 235/439 |
| 2013/0257596 A1 * | 10/2013 | Standish ............... 340/10.1 |
| 2014/0023326 A1 * | 1/2014 | Anderson et al. ............ 385/78 |
| 2014/0138431 A1 | 5/2014 | Standish et al. |
| 2014/0139320 A1 | 5/2014 | Standish et al. |

FOREIGN PATENT DOCUMENTS

| | | |
|---|---|---|
| DE | 10351773 | 6/2004 |
| DE | 102004033940 | 2/2006 |
| EP | 0575100 | 12/1993 |
| EP | 0917377 | 5/1999 |
| EP | 1128314 | 8/2001 |
| EP | 1696680 | 8/2006 |
| GB | 2236398 | 4/1991 |
| GB | 2348287 | 9/2000 |
| WO | 2004044599 | 5/2004 |
| WO | 2005029214 | 3/2005 |
| WO | 2011057383 | 5/2011 |
| WO | 2013144012 | 10/2013 |
| WO | 2014009463 | 1/2014 |

OTHER PUBLICATIONS

U.S. Patent and Trademark Office, "Final Office Action", "U.S. Appl. No. 13/850,580", Nov. 28, 2014, pp. 1-12.

U.S. Patent and Trademark Office, "Office Action", "U.S. Appl. No. 13/850,560", Jan. 21, 2015, pp. 1-50.

European Patent Office, "International Search Report", "from PCT Application Serial No. PCT/EP2013/000441", Aug. 21, 2013, pp. 1-15, Published in: WO.

European Patent Office, "International Search Report", "from related PCT Application No. PCT/EP2013/056419", Jun. 18, 2013, pp. 1-12.

European Patent Office, "International Search Report", "From Corresponding PCT Application No. PCT/EP2013/056419", Jun. 18, 2013, pp. 1-12, Published in: EP.

U.S. Patent and Trademark Office, "Office Action", "from U.S. Appl. No. 13/850,580", Oct. 30, 2013, pp. 1-16, Published in: US.

International Searching Authority, "International Search Report", "from Foreign Counterpart of U.S. Appl. No. 13/850,580", Jul. 4, 2013, pp. 1-8, Published in: WO.

(56) References Cited

OTHER PUBLICATIONS

Mather et al., "Physical Layer Management (PLM) System for Use With an Optical Distribution Frame in Which Trays Can Be Selectively Removed and Reattached", "U.S. Appl. No. 13/766,137", filed Feb. 13, 2013, pp. 1-37.

Lambourn et al., "RFID-Enabled Optical Adapter for Use With a Patch Panel", "U.S. Appl. No. 13/939,830", filed Jul. 11, 2013, pp. 1-39.

Standish, "Presence Detection Using LEDS in RFID Physical Layer Management System", "U.S. Appl. No. 61/670,365", filed Jul. 11, 2012, pp. 1-20.

Standish et al., "RFID Visual Indicator in a Physical Layer Management System", "U.S. Appl. No. 61/670,474", filed Jul. 11, 2012, pp. 1-40.

"ID Tag Requirements for Infrastructure and Network Elements Management", Dec. 2011, pp. 1-32, Publisher: International Telecommunication Union.

U.S. Patent and Trademark Office, "Office Action", "from U.S. Appl. No. 13/850,580", May 30, 2014, pp. 1-11, Published in: US.

U.S. Patent and Trademark Office, "Notice of Allowance", "U.S. Appl. No. 14/080,554", Dec. 5, 2014, pp. 1-35.

* cited by examiner

LOCALIZED READING OF RFID TAGS LOCATED ON MULTIPLE SIDES OF A PORT FROM A SINGLE SIDE USING RFID COUPLING CIRCUIT AND PORTABLE RFID READER

CROSS-REFERENCE TO RELATED APPLICATION

This application claims the benefit of U.S. Provisional Patent Application Ser. No. 61/727,450, filed on Nov. 16, 2012, which is hereby incorporated herein by reference. This application is also related to U.S. patent application Ser. No. 14/080,550, filed on Nov. 14, 2013, and titled "METHOD AND SYSTEM FOR PERFORMING A SINGLE LOCALIZED READ TRANSACTION IN WHICH MULTIPLE RFID TAGS ARE READ", and U.S. patent application Ser. No. 14/080,554, filed on Nov. 14, 2013, and titled "SYSTEM AND METHOD FOR PROVIDING POWER AND COMMUNICATION LINK FOR RFID MANAGED CONNECTIVITY USING REMOVABLE MODULE", both of which are hereby incorporated herein by reference.

BACKGROUND

Patching or other interconnect systems are commonly used in communication networks in order to provide flexibility in implementing logical communication links. One example of a patching or interconnect system is a patch panel. A patch panel typically includes a panel in which a plurality of ports are formed or otherwise housed. Each port includes a "front" connector (or other attachment mechanism) and a "rear" connector (or other attachment mechanism such as a punch-down block or permanently attached optical fiber). The port is configured to communicatively couple any cable attached to the front connector of that port to any cable that is attached to the rear of that port. Other patching systems are implemented in similar ways.

Many types of physical layer management (PLM) systems have been developed in order to automatically keep track of which cables are attached to which ports of a patching system. In one type of system, each connector that is attached to a front connector of a patch panel has a radio frequency identification (RFID) tag attached to it. An RFID reader can then be used to wirelessly read an identifier from each front connector's RFID tag in order to keep track of what connectors and cables are attached to the front connectors of the patch panel. Typically, an RFID reader is integrated into the patch panel in order to read such front RFID tags. However, such systems typically do not include any mechanism to automatically track the rear connectors or cables.

This type of conventional RFID PLM system is typically used within an enterprise or a central office environment. As a result, such RFID PLM systems typically have convenient access to power for the active components of the RFID PLM. Also, such enterprise or central office environments typically have convenient access to communication lines that can be used for "out-of-band" PLM communication purposes. However, this is not always the case in the outside plant of a telecommunication network, where access to power and communication lines that can be used for PLM purposes is typically an issue. Consequently, such RFID PLM systems have not typically been used in the outside plant.

SUMMARY

One embodiment is directed to an adapter comprising a first jack associated with a first side of the adapter and configured so that a first connector can be inserted into the first jack at the first side of the adapter. The adapter further comprises a second jack associated with a second side of the adapter and configured so that a second connector can be inserted into the second jack at the second side of the adapter. The adapter is configured to communicatively couple the first connector to the second connector. The adapter further comprises a coupling circuit configured so that a portable RFID reader can be positioned near a first part of the coupling circuit associated with the first side of the adapter in order to perform a localized read of both an RFID tag attached to the first connector inserted into the first jack of the adapter and an RFID tag attached to the second connector inserted into the second jack of the adapter, wherein the coupling circuit is used to enhance a read range of the portable RFID reader when performing the localized read.

Another embodiment is directed to a patch panel system comprising a panel in which openings are formed and a plurality of adapters as noted in the preceding paragraph that are inserted into the openings in the panel.

Another embodiment is directed to a method comprising inserting a first connector into the first jack at a first side of an adapter and inserting a second connector into the second jack at a second side of an adapter, wherein the adapter is configured to communicatively couple the first connector to the second connector. The method further comprises positioning a portable RFID reader near a first part of a coupling circuit, the first part of the coupling circuit associated with the first side of the adapter. The method further comprises performing a localized read of both an RFID tag attached to the first connector inserted into the first jack of the adapter and an RFID tag attached to the second connector inserted into the second jack of the adapter while the portable RFID reader is positioned near the first part of the coupling circuit and using the coupling circuit to enhance a read range of the portable RFID reader when performing the localized read.

DRAWINGS

DETAILED DESCRIPTION

Figure 1:
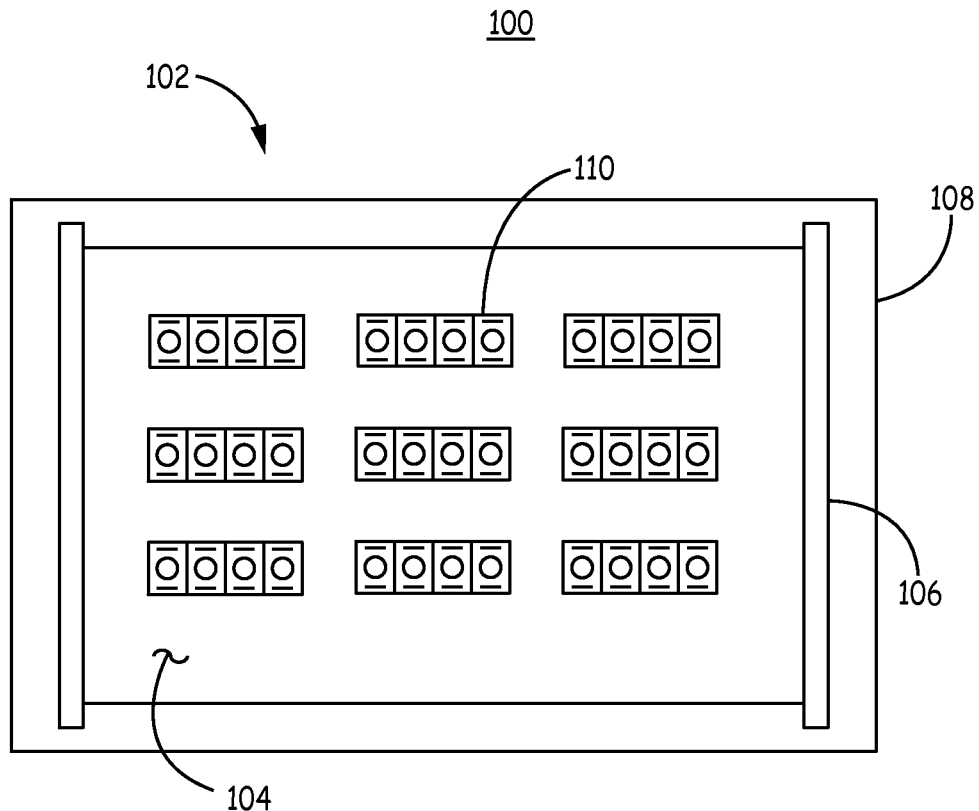
FIG. 1 is a block diagram of one exemplary embodiment of a physical layer management (PLM) system.
Figure 1:
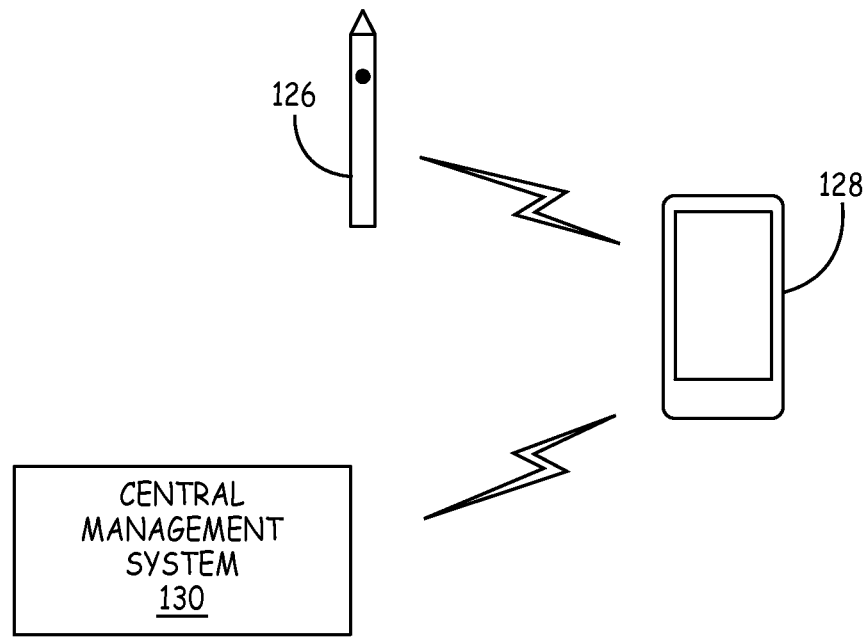

FIGS. 1-4 show one exemplary embodiment of a physical layer management (PLM) system 100. The PLM system 100 comprises an interconnection system 102. In the embodiment shown in FIGS. 1-4, the interconnection system 102 comprises an optical patch panel system 102 that includes a panel 104 that is supported by a rack 106 or other support structure (for example, a support structure that is integrated into an enclosure 108 that houses the components of the patch panel system 102).

In the embodiment shown in FIGS. 1-4, the patch panel system 102 is configured for use in the outside plant of a telecommunication network. In order to protect and secure the components of the patch panel system 102, the patch panel system 102 is housed within a weather- and tamper-resistant enclosure 108. Also, in this embodiment, the optical patch panel system 102 is configured to operate in an outside plant environment where power and communication lines are typically not provided to the optical patch panel system 102 for PLM purposes.

Although the embodiment shown in FIGS. 1-4 is described here as being implemented in the outside plant of a telecommunication network, it is to be understood that other embodiments can be implemented in other ways (for example, in a central office of a telecommunication network, in a data room or a data closet of an enterprise, or an outside plant of a telecommunication network where power and/or communication lines are provided for PLM purposes).

Multiple ports 110 are supported by the panel 104. Each port 110 is configured so that a connection between at least two cables can be made at that port 110. In the exemplary embodiment show in FIGS. 1-4, each port 110 is configured to connect a respective front cable 112 to a respective rear cable 114 so that one or more information bearing signals can be communicated between that front cable 112 and that rear cable 114.

Each port 110 comprises a respective front connector or other attachment mechanism 116 that is mounted to (or otherwise positioned on or near) the panel 104 so that a respective front cable 112 can be physically attached to the front of that port 110. Each port 110 also comprises a respective rear connector or other attachment mechanism 118 that is mounted to (or otherwise positioned on or near) the panel 104 so that a respective rear cable 114 can be physically attached to the rear of that port 110.

In the exemplary embodiment shown in FIGS. 1-4, each port 110 is implemented using a fiber adapter and is also referred to here as a "fiber adapter 110". Also, in this embodiment, the fiber adapters 110 are supported by the panel 104 and are field replaceable. More specifically, each adapter 110 includes a metal clip (or similar structure) to hold that adapter 110 in place when the adapter 110 is inserted into a corresponding opening formed in the panel 104.

In this exemplary embodiment, the front connector or other attachment mechanism 116 in each fiber adapter 110 comprises a front optical jack (for example, an SC jack) and is also referred to here as a "front optical jack 116". Likewise, the rear connector or other attachment mechanism 118 in each fiber adapter 110 comprises a rear optical jack (for example, an SC jack) and is also referred to here as a "rear optical jack 118".

Figure 2:
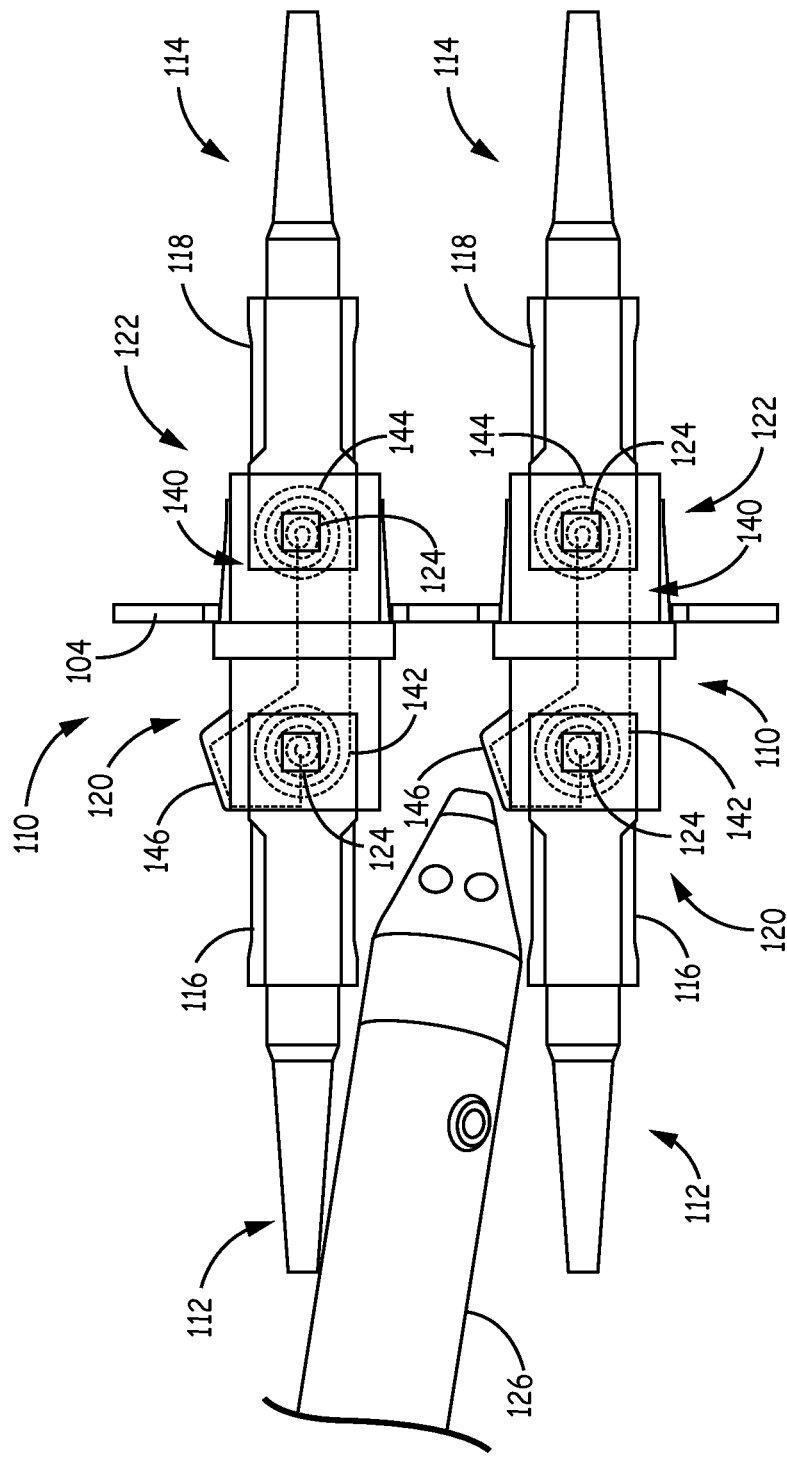
FIG. 2 is a side view of the patch panel of the system shown in FIG. 1.

In this exemplary embodiment, as shown in FIG. 2, each front cable 112 and each rear cable 114 is implemented using a respective front and rear optical cable is terminated using a respective optical cable connector 120 and 122, respectively. Also, in this example, the front and rear optical connectors 120 and 122 are implemented using SC connectors and the adapters 110 are implemented using SC adapters.

It is to be understood, however, that the ports 110 can be implemented in other ways. For example, the ports 110 can be implemented using other types of fiber adapters, the ports 110 can be implemented to connect other types of cables (for example, to electrically connect copper front and rear cables 112 and 114), and/or can be implemented so that the front connector or other attachment mechanism 116 or the rear connector or other attachment mechanism 118 is implemented using a non-connectorized attachment mechanism (for example, in the case of copper cables, using a punchdown block to which a rear cable 118 can be attached or, in the case of optical fibers, by using a fiber adapter that is manufactured with an optical pigtail permanently attached to the rear of it).

In the exemplary embodiment shown in FIGS. 1-4, each front cable connector 120 and each rear cable connector 122 (or the associated front or rear optical cable 112 or 114) has a respective RFID tag 124 attached to or otherwise associated with it.

Each RFID tag 124 can be attached to the cable connector 120 or 122 (or the associated front or rear optical cable 112 or 114) in various ways (for example, using a heat-shrink label or tubing, tape, adhesive). The RFID tag 124 can also be integrated into the cable connector 120 or 122 (or the associated front or rear optical cable 112 or 114).

Figure 3:
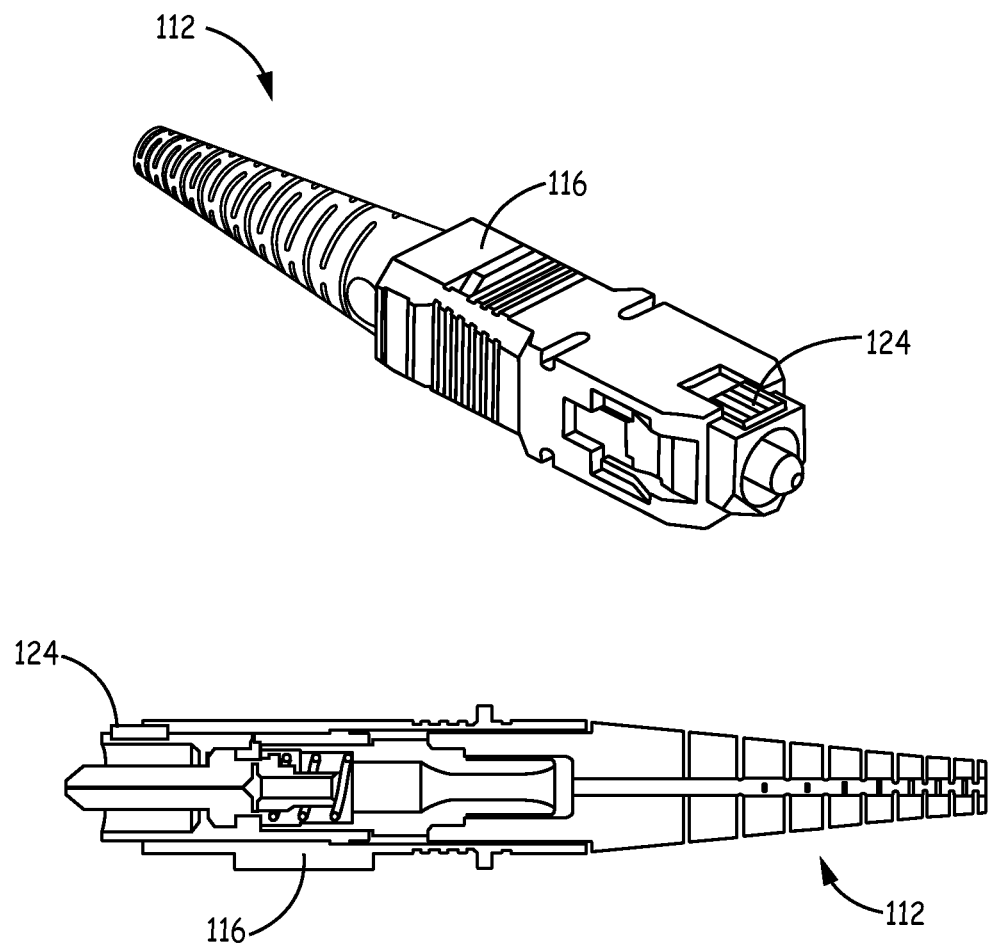
FIG. 3 illustrates a connector used in the system shown in FIG. 1.

This exemplary embodiment is described here as being implemented using SC cable connectors that have key tabs formed on one lateral side of each SC connector. Each of the jacks in each SC adapter 110 has key slot formed in a lateral side thereof that is configured to receive the key tab on an SC connector so that the SC connector can be inserted into the adapter 110 in only one orientation. In this exemplary embodiment, an RFID tag 124 is attached to the other lateral side of the SC connector (that is, the lateral side that does not have the key tab on it). However, it is to be understood that the RFID tag 124 can be attached to the cable connectors 120 and 122 or cables 112 and 114 in other ways. In the exemplary embodiment described here, as shown in FIG. 3, each RFID tag 124 is fitted onto the outside surface of each connectors' inner plastic with a cut out in the external plastic, which allows the inner plastic to move in its normal way and not interfere with the normal operation of the connector. When inserted into the adapter 110 in its normal working position, the center of the RFID tag 124 and the center of the corresponding pickup coil 142 or 144 (described below) will align with one another.

Figure 4:
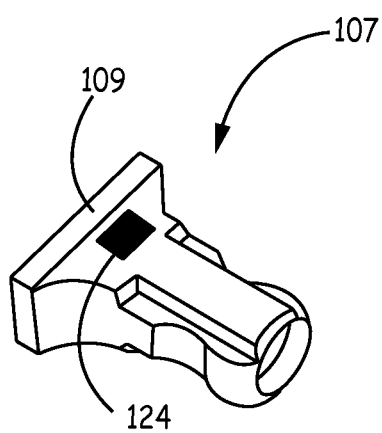
FIG. 4 illustrates a protective cap used in the system in FIG. 1.

Also, in this exemplary embodiment, an RFID tag 124 can be attached to a protective cap 107 that is configured to be inserted into an adapter 110 when it is not in use in order to protect the adapter 110. As shown in FIG. 4, the protective cap 107 comprises a body 109 configured to be inserted into an adapter 110 and an RFID tag 124 attached to the body 109 of the protective cap 107. As noted below, the RFID tag 124 attached to a protective cap 107 can be used for determining if an adapter 110 is unused.

Each RFID tag 124 stores a unique identifier for the associated connector 120 or 122 and/or cable 112 or 114. This identifier can be used to identify which cable 112 or 114 is attached to each port 110 of the patch panel 102. In some implementations, the RFID tags 124 are used to store other information and/or are written to as well as read from. Typically, each RFID tag 124 includes a non-volatile memory that is used to store such information and RFID transponder electronics to enable the RFID tag 124 to be energized by, and communicate with, an RFID reader.

In the following description, for ease of explanation, a "front RFID tag 124 inserted into an adapter 110" (or a "front RFID tag" 124) refers to an RFID tag 124 that is attached to a connector or protective cap 107 (shown in FIG. 4) that is inserted into a front jack 116 of an adapter 110. Likewise, a "rear RFID tag 124 inserted into an adapter 110" (or a "rear RFID tag" 124) refers to an RFID tag 124 that is attached to a connector or protective cap that is inserted into a rear jack 118 of an adapter 110.

In the exemplary embodiment described here in connection with FIGS. 1-4, the information stored in the RFID tags 124 is read using a portable RFID reader 126. More specifically, in this exemplary embodiment, the portable RFID reader 126 is shown as being implemented using a standard commercially available handheld RFID reader pen and is also referred to here as the "handheld" RFID reader 126. However, it is to be understood that the RFID tags 124 can be read using other types of portable RFID readers (for example, handheld or portable RFID readers having form factors other than pens).

The handheld RFID reader 126 includes standard RFID reader electronics for interrogating an RFID tag 124. More specifically, the RFID reader 126 is configured to broadcast a radio frequency (RF) signal that is suitable to energize one or more RFID tags 124 and, in response, cause an RFID tag 124 to transmit at least some of the information stored in it, which is received by the handheld RFID reader 126.

The RFID reader 126 interacts with a mobile communication device 128. In the exemplary embodiment shown in FIGS. 1-4, the mobile communication device 128 is implemented using a smartphone and the RFID reader 126 is communicatively coupled to a mobile communication device 128 using a wireless connection (for example, using a BLUETOOTH wireless connection) so that information read from the RFID tags 124 using the RFID reader 126 can be received by software executing on the mobile communication device 128.

The information that is read from the RFID tags 124 can then be used for various PLM-related purposes. For example, the information read from the RFID tags 124 can be communicated to a central management system 130 that tracks which cables are attached to the patch panel 102. For example, information read from the RFID tags 124 can be communicated from the mobile communication device 128 to the management system 130 using a cellular wireless communication link supported by the mobile communication device 128. Information read from the RFID tags 124 can also be communicated to the management system 130 using a wireless local area network communication link that is implemented by the mobile communication device 128. Information read from the RFID tags 124 can be communicated from the mobile communication device 128 to the management system 130 in other ways (for example, using a wired network connection, a direct wired connection, or removable media).

Also, the information read from RFID tags 124 can be used in assisting a technician in carrying out a work order that, for example, involves moving, adding, or otherwise changing a connection that is made at the patch panel 102. For example, information about a work order that is to be carried can be downloaded to the mobile communication device 128. Software executing on the mobile communication device 128 provides a technician using the mobile communication device 128 with step-by-step directions for performing the work order. Information that is read from the RFID tags 124 can be used by the mobile communication device 128 and/or the central management system 130 to assist the technician in performing the work order. Information read from the RFID tags 124 can be used to identify a particular connector 116 that is to be affected by a step of a work order. Also, information read from an RFID tag 124 after a step of a work order has been performed can be used to confirm that the step was properly carried out.

The information read from the RFID tags 124 can be used for other purposes as well.

In this example, the RFID reader 126 and the RFID tags 124 are configured so that the RFID reader 126 can be used to perform a "localized" read of a particular targeted RFID tag 124 by positioning the antenna of the reader 126 very close to the targeted RFID tag 124 (for example, within 10 millimeters). A "localized" read of a particular targeted RFID tag 124 involves reading only that targeted RFID tag and not any neighboring RFID tags that may be near that targeted small RFID tag 124. The ability to read one particular RFID tag 124 and not any neighboring RFID tags (that is, to perform a localized read) is necessary for many PLM-related purposes (for example, identifying or tracking a particular connector). This configuration can be done by using small RFID tags 124, reducing the power level of the interrogation signal transmitted from the RFID reader 126, and/or using a more selective antenna in the RFID reader 126. The RFID reader 126 can be configured to perform such a localized read in a specific read mode that is one of many supported by the RFID reader 126.

In some situations, however, it may be difficult or inconvenient to access the rear of the patch panel 102 in order to read RFID tags 124 attached to the rear cable connectors 122 or rear cables 114 (even using a handheld RFID reader 126). Also, in some situations, it may be beneficial to be able perform a localized read of both the front and rear RFID tags 124 inserted into an adapter 110 by placing the handheld RFID reader 126 in a single location and without requiring the technician to separately position the handheld RFID reader 126 for each read. In order to address these issues, in the embodiment described here in connection with FIGS. 1-4, each fiber adapter 110 has an associated circuit 140 that is configured to couple a handheld RFID reader 126 positioned near the front of the adapter 110 to any front RFID tag 124 and any rear RFID tag 124 inserted into that adapter 110. Also, in this embodiment, the circuit 140 is configured so that the handheld RFID reader 126 can do this from multiple locations or surfaces on or near the respective adapter 110 (including from the rear of the patch panel 102) while still retaining the localized nature of such read (that is, where only the intended RFID tags 124 are read and unintended RFID tags are not read).

In this exemplary embodiment, the circuit 140 (and the components thereof) are integrated into the adapter 110, though the circuit 140 can be implemented in other ways (for example, using a printed circuit board (PCB) or printed foil system that is attached to the adapter 110 or using a circuit that is integrated into or mounted to the panel 104 instead of the individual adapters 110).

In this exemplary embodiment, each circuit 140 includes two pickup coils—a front pickup coil 142 and a rear pickup coil 144. Also, in this exemplary embodiment, the circuit 140 includes one or more reader coil 146. Although the term "coil" is used here in connection with the exemplary embodiment shown in FIGS. 1-4 for ease of explanation, it is to be understood that any suitable coupling element or structure can be used. The front pickup coil 142 is positioned on the lateral side of the front jack 116 in the adapter 110 that does not include the key slot. The front pickup coil 142 is configured so that when a front SC connector 120 is inserted into the front jack 116, the RFID tag 124 attached to the side of the SC connector 120 will be positioned in the center of the front pickup coil 142. Similarly, the rear pickup coil 144 is positioned on the lateral side of the rear jack 118 in the adapter 110 that does not include the key slot. The rear pickup coil 144 is configured so that when a rear SC connector 122 is inserted into the rear jack 118, the RFID tag 124 attached to the side of the SC connector 120 will be positioned in the center of the rear pickup coil 142. It is to be understood that the pickup coils 142 and 144 can be configured in other ways.

Each reader coil 146 is positioned on or near the respective adapter 110 in a location other than where the front and rear pickup coils 142 and 144 are located. In the exemplary embodiment shown in FIGS. 1-4, one reader coil 146 is used. The reader coil 146 is located on a top surface of the front jack 116 in the adapter 110 and is oriented at an angle so as to provide better coupling with the RFID reader 126.

The circuit 140 electrically couples the reader coil 146 to the front and rear pickup coils 142 and 144. As a result of this coupling, the reader coil 146 provides an additional point on or near the respective adapter 110 where the handheld RFID reader 126 can be placed in order to read any front or rear RFID tags 124 inserted into that adapter 110. Moreover, because the reader coil 146 and pickup coils 142 and 144 are all coupled to one another, a technician can place the handheld RFID reader 126 near any of the reader coil 146 or pickup coils 142 or 144 for the adapter 110 and read any front RFID tag 124 inserted into that adapter 110 and any rear RFID tag 124 inserted into that adapter 110 without having to re-position the handheld RFID reader 126. This can be especially beneficial in outside plant applications (for example, where there is poor lighting, which could make it difficult to precisely position the handheld RFID reader 126).

Moreover, the reader coil 146 can be positioned in a location where it is more convenient for the technician to place and hold the handheld RFID reader 126, while having the front and rear pickup coils 142 and 144 positioned in locations that are more suitable for reading any front and rear RFID tags 124 and/or that make the adapter 110 and/or panel system 102 easier to manufacture, install, service, or secure or that result in a more durable or reliable adapter 110 or overall panel system 102. Again, this can be especially beneficial in outside plant applications (for example, where there is poor lighting, which could make it difficult to precisely position the handheld RFID reader 126).

In the exemplary embodiment shown in FIGS. 1-4, the pickup coils 142 and 144 and reader coil 146, for example, are all implemented using a single loop of a conductor (such as a copper or aluminum wire or stamped metal)—that is, the pickup coils 142 and 144 and the reader coil 146 are implemented using different portions of the same loop. Also, in this exemplary embodiment, the pickup coils 142 and 144 and reader coil 146 are embedded into the body of the adapter 110. However, as noted above, the reader and pickup functions of the circuit 140 can be implemented in other ways, for example, using respective true coils coupled in parallel. Such coils can be implemented for example, using respective wire coils, respective printed circuit board (PCB) spirals, respective PCB rectangular coils, etc. Moreover, the reader and pickup coils or other coupling elements or structures need not all be implemented the same way. Also, one or more of the coils can be mounted on a PCB that is attached to each adapter 110, instead of being embedded in the body of the adapter 110. Other coupling elements or structures can also be used.

In this example, the single coil circuit 140 is un-tuned and freely resonant. The inherent coupling factor is achieved in this example by having the field associated with the RFID tags 124 and the handheld RFID reader 126 being inside the inner edge of the pickup coils 142 and 144 and the reader coil 146, respectively.

In this exemplary embodiment, as noted above, the handheld RFID reader 126 is configured so that the RF field emitted from the handheld RFID reader 126 is localized or constrained so as to only energize and read the front and rear RFID tags 124 inserted into one particular adapter 110 (which is also referred to here as the "target" adapter 110). More specifically, the handheld RFID reader 126 is configured to energize and read the front and rear RFID tags 124 inserted into the "target" adapter 110 when the antenna portion of the handheld RFID reader 126 is placed on or very close to the reader coil 146 or the front or rear pickup coils 142 or 144 for the target adapter 110. For example, the output power and/or antenna of the handheld RFID reader 126 can be configured so as to achieve the desired level of localization or constraint. Also, the reader coil 146 and pickup coils 142 and 144 are configured to have an appropriate level of sensitivity.

As noted above, the circuit 140 electrically couples the reader coils 146 to the front and rear pickup coils 142 and 144 so that a technician can read both any front RFID tag 124 inserted into that adapter 110 and any rear RFID tag 124 inserted into that adapter 110 by positioning the handheld RFID reader 126 on or near the reader coil 146 or the pickup coils 142 or 144 without requiring the technician to re-position the handheld RFID reader 126. One exemplary way of doing this is involves the technician positioning the antenna portion of the handheld RFID reader 126 on or near the reader coil 146 or pickup coils 142 or 144 of the target adapter 110 and initiating a read transaction that reads both any front RFID tag 124 inserted into the target adapter 110 and a rear RFID tag 124 inserted into the target adapter 110. Typically, the handheld RFID reader 126 is positioned on or near the reader coil 146 or the front pickup coil 142 of the target adapter 110 since those coils are located on the front of the panel 104 and are typically more convenient to access than the rear pickup coil 144. However, it is to be understood that there may be situations where a technician is accessing the rear of the panel 104 and may wish to position the handheld RFID reader 126 on or near the rear pickup coil 144 instead of the reader coil 146 or the front pickup coil 142.

The circuit 140 (more specifically, the reader coil 146 and at least one of the front and rear pickup coils 142 and 133) is used to enhance the read range of the RFID reader 126 when performing the localized read.

Typically, the handheld RFID reader 126 will include a button, switch, or other mechanism by which a technician can initiate such a read transaction using the handheld RFID reader 126. Alternatively, such a read transaction can be initiated using software executing on the mobile communication device 128.

Once the read transaction is initiated, the handheld RFID reader 126 broadcasts a radio frequency (RF) signal that is suitable to energize any front or rear RFID tags 124 inserted into the target adapter 110 and, in response, cause the front and rear RFID tags 124 (if any) to transmit at least some of the information stored in them. One way to do this uses the standard RFID anti-collision protocols that standard RFID tags 124 implement to address situations where multiple RFID tags 124 attempt to transmits at the same time.

With this approach, in order to read both a front RFID tag 124 and rear RFID tag 124 inserted into a target adapter 110 without requiring the technician to separately position the handheld RFID reader 126 for each read, the handheld RFID reader 126 and/or software executing on the mobile communication device 128 are configured to broadcast the RF interrogation signal and wait until responsive transmissions are received from both a front RFID tag 124 and a rear RFID tag 124 or until a timeout period has elapsed. With this approach, the timeout period that the handheld RFID reader 126 and/or software executing on the mobile communication device 128 wait to receive transmissions should be sufficiently long to allow both a front RFID tag 124 and a rear RFID tag 124 to transmit their information in the situation where the worst-case delay is incurred using the standard RFID anti-collision protocol. Also, the handheld RFID reader 126 and/or software executing on the mobile communication device 128 are configured to wait in that way before providing any signal to the technician that the read transaction is complete.

One issue with this approach is that the standard RFID anti-collision protocols may result in such read transactions takes too long.

Another approach makes use of the application family identifier (AFI) defined by the ISO RFID standards. In general, when the AFI is used, the RFID tags are configured to respond only to only a particular type of RFID interrogation signal (that is, an RFID interrogation signal that includes an AFI byte with a particular value).

Figure 5:
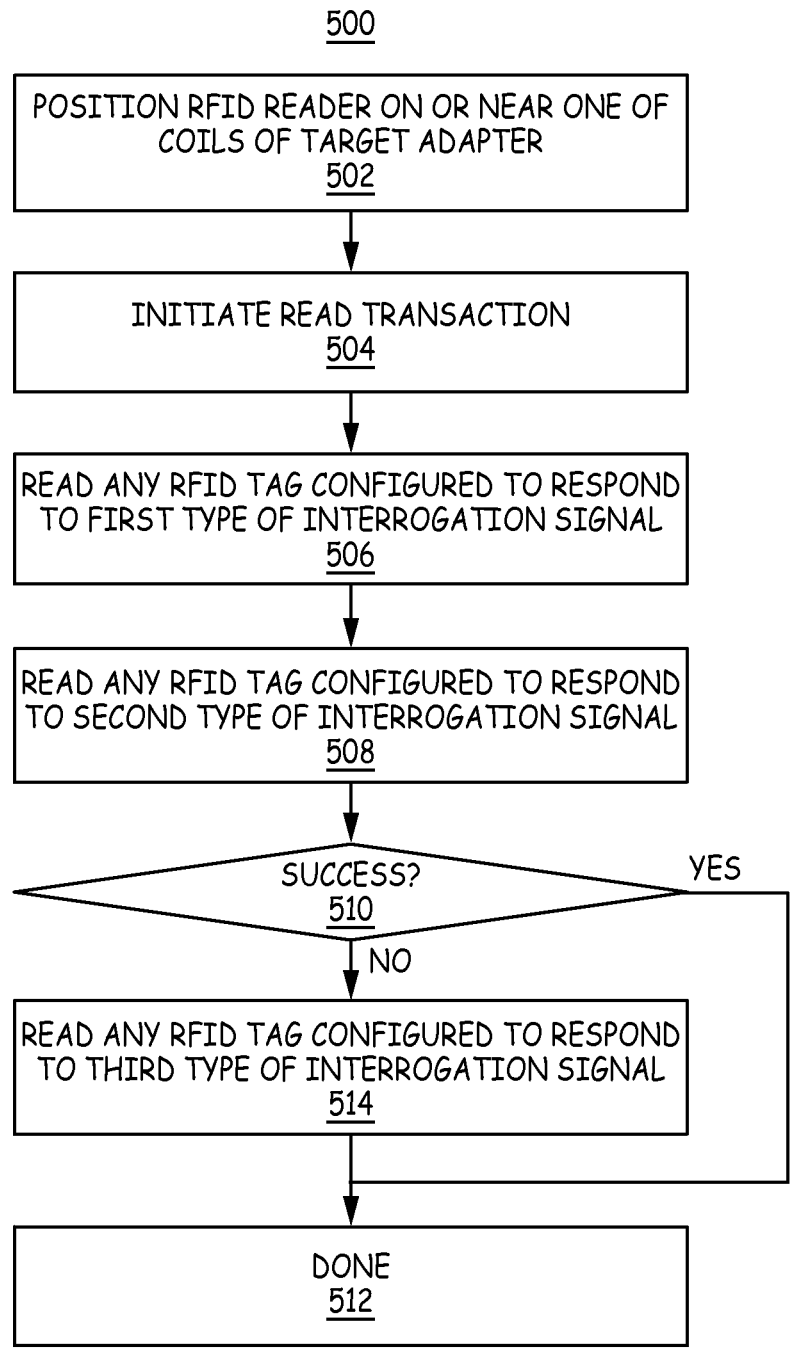
FIG. 5 is a flow diagram of an exemplary embodiment of a method of reading both any front RFID tag inserted into a target adapter and any rear RFID tag inserted into that adapter.

FIG. 5 is a flow diagram that illustrates an exemplary embodiment of a method 500 of reading both any front RFID tag 124 inserted into a target adapter 110 and any rear RFID tag 124 inserted into that adapter 110. The exemplary embodiment of method 500 shown in FIG. 5 uses RFID tags 124 that are each configured to respond a particular type of RFID interrogation signal. This is done to read multiple RFID tags 124 in a way that is faster than simply using the standard RFID anti-collision protocol. This exemplary embodiment of method 500 is described here as being implemented using the system 100 shown in FIGS. 1-4, though it is to be understood that other embodiments can be implemented in other ways.

In this embodiment, each of the RFID tags 124 is configured to respond an RFID interrogation signal that includes a particular AFI value. In this embodiment, three different AFI values are used. A first AFI value is assigned to rear RFID tags 124 that are attached to rear SC connectors 122 that are inserted into the rear jack 118 of the adapters 110, a second AFI value is assigned to front RFID tags 124 that are attached to front SC connectors 120 that are inserted into front jacks 116 of the adapters 110, and a third AFI value is assigned to the RFID tags 124 that are attached to protective caps 107 that are inserted into the front jacks 116 of unused front jacks 116.

The RFID tag 124 attached to the protective cap 107 is used to determine if a jack of the adapter 110 is unused. That is, if a jack of an adapter 110 has a protective cap 107 in it (which is determined by reading the RFID tag 124 attached to the protective cap), the jack is considered to be unused.

Method 500 comprises positioning the antenna portion of the handheld RFID reader 126 on or near the reader coil 146 or pickup coils 142 or 144 of the target adapter 110 (block 502). As noted above, the handheld RFID reader 126 is typically positioned on or near one of the reader coil 146 or the front pickup coil 142 since those coils are located on the front of the panel 104 and are typically more convenient to access than the rear pickup coil 144. However, as noted above, it is to be understood that there may be situations where a technician is accessing the rear of the panel 104 and may wish to position the handheld RFID reader 126 on or near the rear pickup coil 144 instead of the reader coil 146 or the front pickup coil 142.

Method 500 further comprises initiating a read transaction that reads both any front RFID tag 124 inserted into the target adapter 110 and any rear RFID tag 124 inserted into the target adapter 110 (block 504). The technician can initiate the read transaction by pressing a button (or other switch or trigger) on the handheld RFID reader 126 or by using the software executing on the mobile communication device 128.

When a localized read transaction is initiated, the handheld reader 126 first reads any RFID tag 124 that is configured to respond to a first type of RFID interrogation signal (block 506). This is done in a localized manner. That is, this localized read is done so that only an RFID tag 124 attached to a connector inserted into the targeted adapter 110 will be read and not an RFID tag 124 attached to a connector inserted into a neighboring adapter 110. In this exemplary embodiment, the first type of RFID interrogation signal is an RFID interrogation signal that includes a first AFI value, and only those RFID tags 124 that have the first AFI value assigned to them respond to such an RFID interrogation signal. In this exemplary embodiment, rear RFID tags 124 attached to rear SC connectors 122 that are inserted into the rear jack 118 of the adapters 110 are assigned the first AFI value.

In this exemplary embodiment, when the handheld RFID reader 126 reads any RFID tag 124 inserted into the adapter 110 that has the first AFI value assigned to it, the handheld RFID reader 126 broadcasts an interrogation signal that includes the first AFI value. Any rear RFID tag 124 inserted into the target adapter 110 will be energized by the broadcast interrogation signal and will determine that the broadcast interrogation signal includes the first AFI value. As a result, the rear RFID tag 124 will respond to that broadcast interrogation signal by transmitting the information stored in the RFID tag 124.

Any front RFID tag 124 inserted into the front jack 116 of the target adapter 110 (either an RFID tag 124 attached to a front SC connector 120 or an RFID tag 124 attached to a protective cap 107) will also be energized by the interrogation signal broadcast by the handheld RFID reader 126 during this first read but will determine that the interrogation signal does not include the AFI value assigned to those RFID tags 124 and, as a result, will not respond to that interrogation signal. Therefore, the anti-collision protocols will not need to be used to prevent the RFID tags 124 from transmitting at the same time as the rear RFID tag 124 having the first AFI value assigned to it.

The handheld reader 126 will continue to broadcast this first interrogation signal and wait for a response from any rear RFID tag 124 inserted into the target adapter 110 having the first AFI value assigned to it until any such RFID tag 124 has responded or a timeout period has elapsed. In this example, the timeout period is set to provide sufficient time for any rear RFID tag 124 inserted into the target adapter 110 having the first AFI value assigned to it to respond to the interrogation signal.

After the handheld reader 126 has received a response from any rear RFID tag 124 inserted into the target adapter 110 that is configured to configured to respond to a first type of RFID interrogation signal or the timeout period has elapsed, the handheld reader 126 reads any RFID tag 124 that is configured to respond to a second type of RFID interrogation signal (block 508). This is done in a localized manner so that only an RFID tag 124 attached to a connector inserted into the targeted adapter 110 will be read and not an RFID tags 124 attached to a connector inserted into a neighboring adapter 110. In this exemplary embodiment, the second type of RFID interrogation signal is an RFID interrogation signal that includes a second AFI value, and only those RFID tags 124 that have the second AFI value assigned to them respond to such an RFID interrogation signal. In this exemplary embodiment, front RFID tags 124 attached to the front SC connectors 120 that are inserted into the front jack 116 of the adapters 110 are assigned the second AFI value.

In this exemplary embodiment, when the handheld RFID reader 126 reads any RFID tag 124 inserted into the adapter 110 that has the second AFI value assigned to it, the handheld RFID reader 126 broadcasts an interrogation signal that includes the second AFI value. Any front RFID tag 124 inserted into the target adapter 110 will be energized by the broadcast interrogation signal and will determine that the broadcast interrogation signal includes the second AFI value. As a result, the front RFID tag 124 will respond to that broadcast interrogation signal by transmitting the information stored in the RFID tag 124.

Any rear RFID tag 124 inserted into the rear jack 118 of the target adapter 110 or any front RFID tag 124 attached to a protective cap 107 will also be energized by the interrogation signal broadcast by the handheld RFID reader 126 during this second read but will determine that the interrogation signal does not include the AFI value assigned to those RFID tags 124 and, as a result, will not respond to that interrogation signal. Therefore, the anti-collision protocols will not need to be used to prevent the RFID tags 124 from transmitting at the same time as the front RFID tag 124 having the second AFI value assigned to it.

If the handheld reader 126 receives a response from a front RFID tag 124 inserted into the target adapter 110 that is configured to respond to the second type of RFID interrogation signal (checked in block 510), the read transaction is complete (block 512).

If the timeout period elapses with the handheld reader 126 not receiving a response from any front RFID tag 124 inserted into the target adapter 110 that is configured to respond to the second type of RFID interrogation signal, the handheld reader 126 reads any RFID tag 124 configured to respond to a third type of RFID interrogation signal (block 514). In this exemplary embodiment, the third type of RFID interrogation signal is an RFID interrogation signal that includes a third AFI value, and only those RFID tags 124 that have the third AFI value assigned to them respond to such an RFID interrogation signal. In this exemplary embodiment, front RFID tags 124 attached to protective caps 107 that are inserted into the front jack 116 of the adapters 110 are assigned the third AFI value.

In this exemplary embodiment, when the handheld RFID reader 126 reads any RFID tag 124 inserted into the adapter 110 that is configured to respond to the third type of RFID interrogation signal, the handheld RFID reader 126 broadcasts an interrogation signal that includes the third AFI value. Any such front RFID tag 124 inserted into the target adapter 110 will be energized by the broadcast interrogation signal and will determine that the broadcast interrogation signal includes the third AFI value. As a result, the front RFID tag 124 will respond to that broadcast interrogation signal by transmitting the information stored in the RFID tag 124.

Any rear RFID tag 124 inserted into the rear jack 118 of the target adapter 110 or any front RFID tag 124 attached to a front SC connector 120 will also be energized by the interrogation signal broadcast by the handheld RFID reader 126 during this third read but will determine that the interrogation signal does not include the AFI value assigned to those RFID tags 124 and, as a result, will not respond to that interrogation signal. Therefore, the anti-collision protocols will not need to be used to prevent the RFID tags 124 from transmitting at the same time as the front RFID tag 124 having the third AFI value assigned to it.

After the handheld reader 126 has received a response from any front RFID tag 124 inserted into the target adapter 110 that is configured to respond to the third type of Interrogation signal or the timeout period has elapsed, the read transaction is complete (block 512).

As noted above, AFI values are used to prevent more than one RFID tag 124 inserted into the target adapter 110 from transmitting at the same time without having to use the standard RFID anti-collision protocols. In this way, the delays associated with using the standard RFID anti-collision protocols can be avoided and the overall speed of the read transaction can be increased while at the same time enabling the reading of any front and rear RFID tags 124 inserted into a target adapter 110 in a way that does not require a technician to separately position the RFID reader 126 to read each of the RFID tags 124 and to initiate a separate read operation for each RFID tag 124 inserted into the adapter 110.

Figure 6:
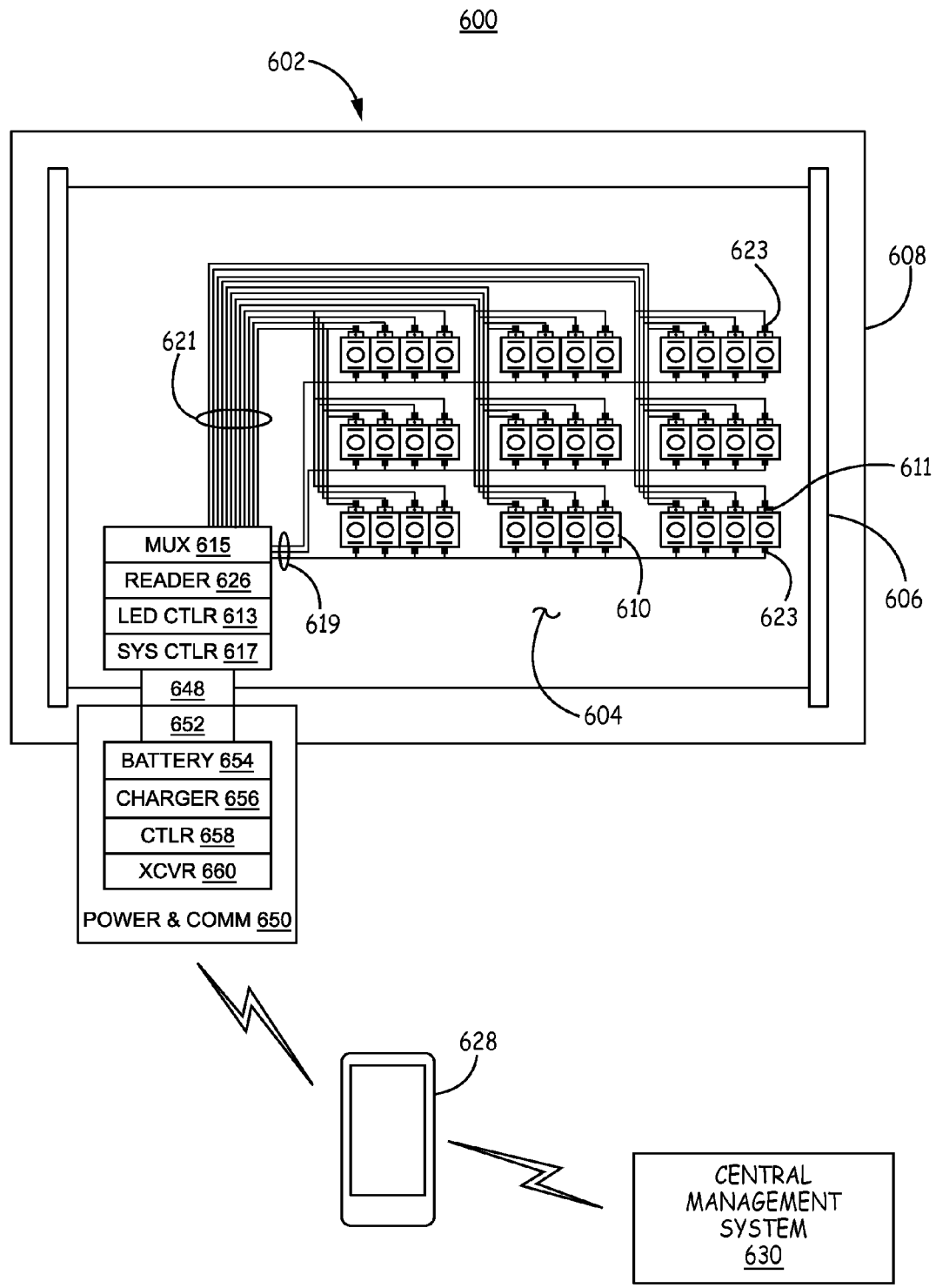
FIG. 6 is a block diagram of another exemplary embodiment of a physical layer management (PLM) system.
Figure 7:
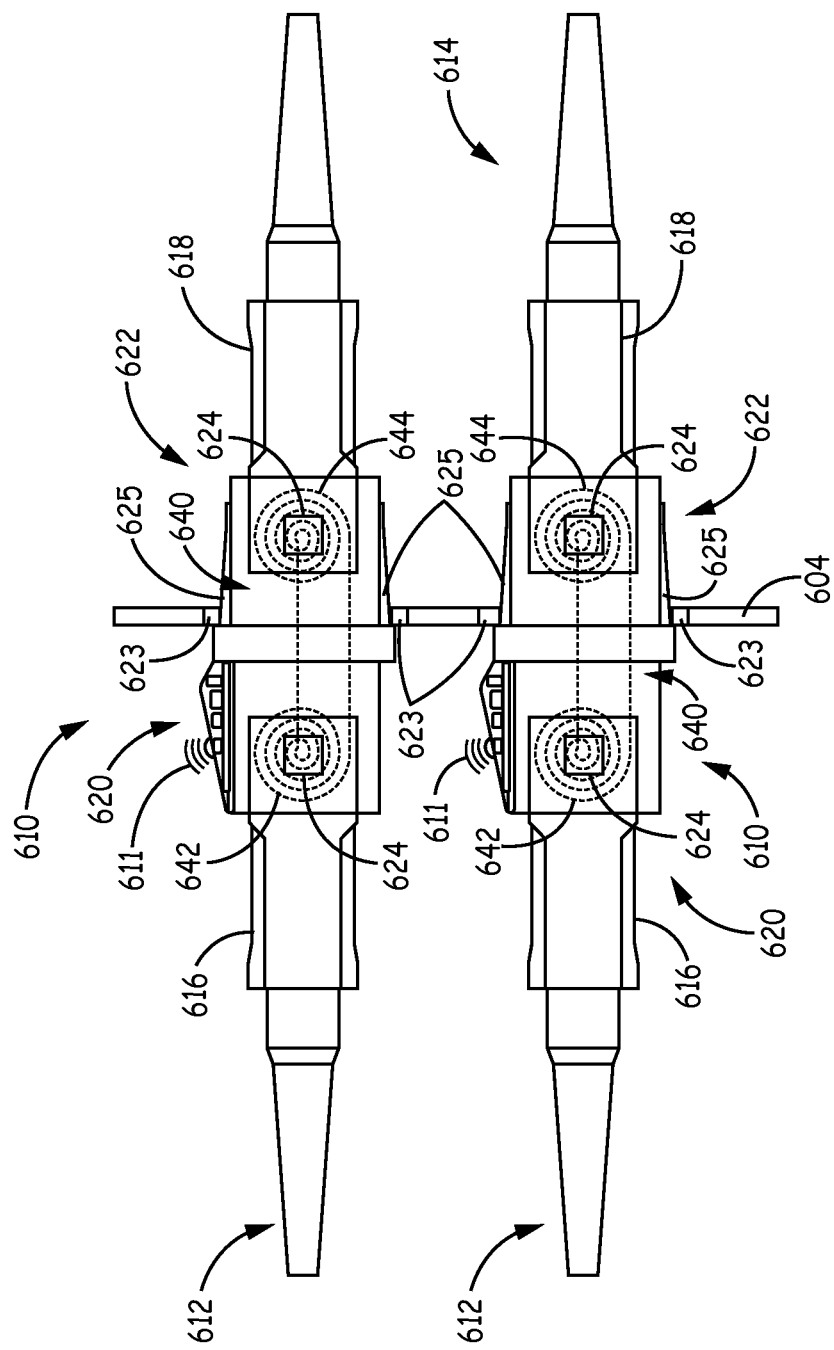
FIG. 7 is a side view of the patch panel of the system shown in FIG. 6.
Figure 8:
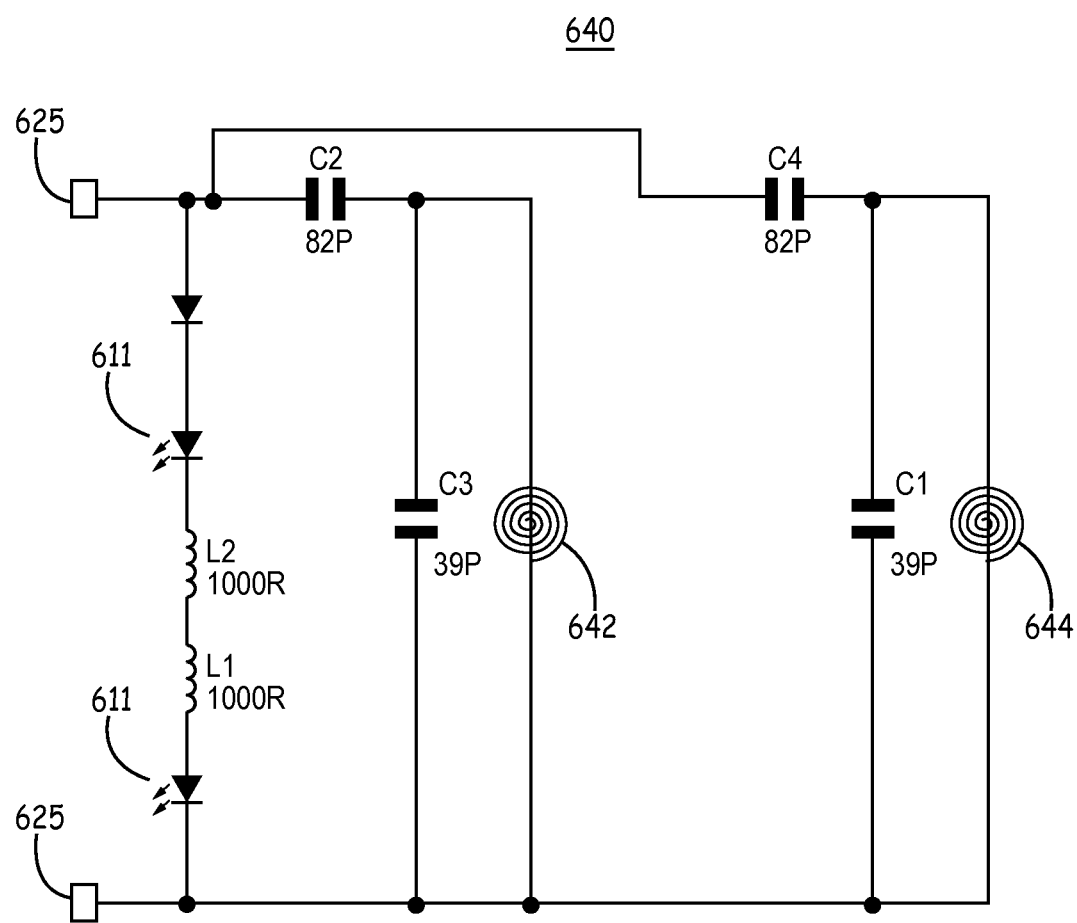
FIG. 8 is a circuit diagram illustrating one example of filter components suitable for use in the system of FIG. 6.

FIGS. 6-8 show another exemplary embodiment of a physical layer management (PLM) system 600. The PLM system 600 comprises an interconnection system 602 (specifically, an optical patch panel system 602). In general, the PLM system 600 and patch panel system 602 are generally the same as the PLM system 100 and patch panel system 102 described above in connection with FIGS. 1-4, except as described below. The elements of the exemplary embodiment shown in FIGS. 6-8 that are similar to corresponding elements of the exemplary embodiment shown in FIGS. 1-4 are referenced in FIGS. 6-8 using the same reference numerals used in FIGS. 1-4 but with the leading numeral changed from a "1" to a "6". Except as described below, the description of the elements set forth above in connection with the exemplary embodiment shown in FIGS. 1-4 applies to the corresponding elements of the exemplary embodiment shown in FIGS. 6-8 but generally will not be repeated in connection with FIGS. 6-8 for the sake of brevity.

In the exemplary embodiment shown in FIGS. 6-8, each port 610 is implemented using an intelligent fiber adapter 610. As with the adapters 110 used in the embodiment shown in FIGS. 1-4, in the embodiment shown in FIGS. 6-8, the fiber adapters 610 are supported by the panel 604 and are field replaceable.

In this exemplary embodiment, each adapter 610 includes a circuit 640 that includes front and rear pickup coils 642 and 644 that, except as described below, generally function the same as the front and rear pickup 142 and 144 shown in FIGS. 1-4. Moreover, in this exemplary embodiment, the circuit 640 of each adapter 610 includes one or more light emitting diodes (LEDs) or other visual indicators 611.

Also, the LED 611 itself can be used as the primary visual indicator or can be used to illuminate some other elements (for example, a light pipe material in the adapter, connector, or protective cap that is used to provide a visual indicator in a more visible or suitable location and/or a boot of a connector inserted into the associated adapter). Examples of such illumination techniques are described in U.S. Provisional Patent Application Ser. No. 61/727,343, filed on even date herewith and entitled "INDICATING COMMUNICATIONS COMPONENTS VIA ILLUMINATION", which is hereby incorporated herein by reference.

In this exemplary embodiment, the components of each of circuit 640 are embedded into the body of the associated adapter 610. It is to be understood, however, that other embodiments can be implemented in other ways, for example, by mounting the components of the circuit 640 to a PCB, which in turn is attached to the corresponding adapter 610. One example of such a PCB-based approach is described in U.S. Provisional Patent Application No. 61/670,357, filed on Jul. 11, 2012 and entitled "RFID-Enabled Fiber Adapter", which is hereby incorporated herein by reference.

The pickup coils 642 and 644 for multiple adapters 610 are communicatively coupled to a single RFID reader 626 that is mounted to the panel 604. Also, LEDs 611 for multiple adapters 610 are communicatively coupled to a single LED controller 613 that is mounted to the panel 604. The LED controller 613 is configured to turn the LEDs 611 on and off (for example, to provide a visual indication to a technician in connection with the technician carrying out an electronic work order).

In the exemplary embodiment shown in FIGS. 6-8, the pickup coils 642 and 644 for all of the adapters 610 are coupled to the same RFID reader 626, and the LEDs 611 for all of the adapters 610 are coupled to the same LED controller 613.

In the exemplary embodiment shown in FIGS. 6-8, a multiplexer 615 mounted to the panel 604 is used to selectively couple the RFID reader 626 and the LED controller 613 to the circuit 640 for one of the adapters 610 in the panel 604. Also, a system controller 617 is mounted to the panel 604 and is communicatively coupled to the RFID reader 626 and the LED controller 613.

Each circuit 640 is coupled to the multiplexer 615 using two lines that are used both for coupling the pickup coils 642 and 644 to the RFID reader 626 and for coupling the LED 611 to the LED controller 613. FIG. 7 shows one example of a circuit 640 that is configured for use in controlling the LEDs 611 associated with an adapter 610 and for communicating with the pickup coils 642 and 644 using the same two lines. In this example, the LED controller 613 controls the LEDs 611 using direct current (DC) signals, whereas the RFID reader 626 interrogates RFID tags 624 inserted into that adapter 610 (via the pickup coils 642 and 644) using radio frequency (RF) AC signals. The circuit 640 includes appropriate filter components that isolate the DC signals used for controlling the LEDs 611 and the RF AC signals used for interrogating RFID tags 624 from one another. One example of such filtering components is shown in FIG. 8. As shown in FIG. 8, one or more inductors and diodes are used to isolate the DC signals used for controlling the LEDs 611, and one or more capacitors are used to isolate the AC signals used for interrogating RFID tags 624. It is to be understood, however, that FIG. 8 illustrates only one example and the other embodiments can be implemented in other ways.

An X-Y array is used to selectively couple the multiplexer 615 to the circuit 640 of one of the adapters 610. In this example, all of the adapters 610 in each row of the panel 602 share a common "row" line 619 that is connected to a respective row I/O terminal of the multiplexer 615. Also, all of the adapters 610 in each column of the panel 602 share a common "column" line 621 that is connected to a respective column I/O terminal of the multiplexer 615. Under the control of the system controller 617, the multiplexer 615 is able select one of the adapters 610 by coupling one of its row I/O terminals (and the corresponding row line 619 connected to it) and one of its column I/O terminals (and the corresponding column line 621 connected to it) to the RFID reader 626 and the LED controller 613. This causes the circuit 640 of the adapter 610 located at the selected row and column to be coupled to the RFID reader 626 and the LED controller 613. The number of control lines in the system 100 is greatly reduced by using the same lines in the X-Y array for coupling the pickup coils 642 and 644 to the RFID reader 626 and for coupling the LED 611 to the LED controller 613.

In the exemplary embodiment shown in FIGS. 6-8, the panel 604 is implemented using a printed circuit board in which openings are formed into which each of the adapters 610 is inserted. The PCB that is used to implement the panel 604 of the patch panel system 602 includes, for each adapter 610, a pair of edge plated pads 623 on the top and bottom of the opening. For each adapter 610, one of the pads 623 terminates the row line 619 for that adapter and the other of the pads 623 terminates the column line 621 for that adapter 610.

Each adapter 610 has a pair of contacts 625, each of which comes into contact with one of the pads 623 when the adapter 610 is inserted into the opening on the panel 604. The contacts 625 electrically couple the circuit 640 (and the components thereof) to the lines 619 and 621. In the example shown in FIGS. 6-8, the body of each adapter 610 has a middle ridge that, when the adapter 610 is inserted into an opening in the panel 604, comes into contact with the face of the panel 604 and prevents the adapter 610 from sliding through the opening. In this example, the contacts 625 for each adapter 610 are formed on the top and bottom surface of the rear portion of the body of the adapter 610 near the middle ridge that comes into contact with the face of the panel 604. Likewise, the edge pads 623 for each adapter 610 are formed on the panel 604 near the bottom and top of the opening in locations that come will come into physical contact with the contacts 625 formed on the adapter 610 when it is fully inserted into that opening. It is to be understood, however, that the contacts 625 and edge pads 623 can be located in other locations (for example, the contacts 625 for the adapter 610 can be integrated into clips that are used to hold the adapter 610 in the opening of the panel 604).

In exemplary embodiment, the lines 619 and 621 are formed on or in the printed circuit board from which the panel 604 is formed. For ease of illustration, the lines 619 and 621 are visible in FIG. 6. However, in one implementation, the panel 604 is formed to appear as a conventional metal panel used in conventional patch panels by painting (or otherwise covering) the printed circuit board (and the lines 619 and 621 formed therein or thereon) with a color of the type used on conventional metal panels.

In the exemplary embodiment show in FIGS. 6-8, the patch panel system 602 is configured for use in the outside plant of a telecommunication network where power and communication lines are typically not provided to the patch panel system 602 for PLM purposes.

The patch panel system 602 includes an interface 648 to which a portable power and communication module 650 can be connected in order to provide power to the active components of the system 600 (for example, the LEDs 611, LED controller 613, multiplexer 615, system controller 617, and RFID reader 626) and a wireless communication link to a mobile communication device 628 used by a technician.

The portable power and communication module 650 includes a suitable connector 652 to connect to the interface 648 of the patch panel system 602 (for example, using a Universal Serial Bus (USB) or other connector that supports both communications and power). Also, the patch panel system 602 includes some mechanism to hold or otherwise support the portable power and communication module 650 while it is connected to the patch panel system 602 so that the technician need not hold it while working at the panel system 602.

The portable power and communication module 650 includes a rechargeable battery 654 that is used to supply power to the active components of the patch panel system 602 over the connector 652 and interface 648. Also, the portable power and communication module 650 further includes a battery charger 656 that can be used to connect the portable power and communication module 650 to a power source for charging the rechargeable battery 654.

The portable power and communication module 650 also includes a controller 658 that, when the module 650 is connected to the patch panel system 602, communicates with the system controller 617 in the patch panel system 602 over the connector 652. The portable power and communication module 650 includes a wireless transceiver 660 (for example, a wireless transceiver that implements a BLUETOOTH wireless link) for communicating with a mobile communication device 628 used by a technician. The portable power and communication module 650 can be configured to communicate with the mobile communication device 628 in other ways (for example, using other types of wireless links and/or using wired links).

In operation, the portable power and communication module 650 is typically connected to an AC mains outlet to charge the rechargeable battery 654 when the portable power and communication module 650 is not connected to, and is away from, a patch panel system 602. Then, after the rechargeable battery 654 is charged, the portable power and communication module 650 can be brought to a patch panel system 602 and connected to the interface 648 of the patch panel system 602 in order to provide power to the patch panel system 602. Also, when the portable power and communication module 650 is connected to the interface 648 and the components of the patch panel system 602 are powered on, the portable controller 658 and the system controller 617 are able to communicate with one another over the connector 652 and interface 648. The portable power and communication module 650 also pairs with (or otherwise connects to) the mobile communication device 628 used by the technician over a wireless connection.

Then, software executing on the mobile communication device 628 can cause the RFID reader 626 in the patch panel system 602 to poll all of the adapters 610 in the system 602. That is, the multiplexer 617 successively selects each of the adapters 610 (using the row and column lines 619 and 621 for that adapter 610) and couples the pickup coils 622 and 644 for the selected adapter 610 to the RFID reader 626, which can then read any front and rear RFID tags 624 inserted into the selected adapter 610. AFI values can be used to distinguish between RFID tags 624 attached to protective caps 607, front connectors 620, and rear connectors 622 in a similar manner as described above in connection with FIG. 5. The information that is read from the RFID tags 624 can be used as described above in connection with FIGS. 1-4 (for example, the information can be communicated to the central management system 630 using a cellular or wireless local area network link provided between the mobile communication device 628 and the central management system 630).

Also, the software executing on the mobile communication device 628 can turn on and off various LEDs 611 in the patch panel system 602 (for example, to guide the technician to a particular adapter 610 that should be affected by a particular move, add, or change of a connection as a part of carrying out an electronic work order). To do this, the multiplexer 617 selects one of the adapters 610 (using the row and column lines 619 and 621 for that adapter 610) and couples the LED 611 for that adapter 610 to the LED controller 613, which can then turn the LED 611 on or off.

After the technician is done working at that patch panel system 602, the portable power and communication module 650 can be removed from the interface 648 and taken to new location.

In this way, a permanent power line (or other power source) and communication link need not be provided to the patch panel system 602 solely for physical-layer management purposes.

These techniques can be applied to other types of devices (for example, other types of adapters and connectors, as wells as other similar devices, etc.).

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

Example Embodiments

Example 1 includes an adapter comprising: a first jack associated with a first side of the adapter and configured so that a first connector can be inserted into the first jack at the first side of the adapter; a second jack associated with a second side of the adapter and configured so that a second connector can be inserted into the second jack at the second side of the adapter, wherein the adapter is configured to communicatively couple the first connector to the second connector; and a coupling circuit configured so that a portable RFID reader can be positioned near a first part of the coupling circuit associated with the first side of the adapter in order to perform a localized read of both an RFID tag attached to the first connector inserted into the first jack of the adapter and an RFID tag attached to the second connector inserted into the second jack of the adapter, wherein the coupling circuit is used to enhance a read range of the portable RFID reader when performing the localized read.

Example 2 includes the adapter of Example 1, wherein the coupling circuit comprises a first pickup coil, a second pickup coil, and a reader coil; wherein the first coupling coil is configured so that an RFID tag attached to the first connector, when inserted into the first jack, will be positioned near the first pickup coupling structure; wherein the second coupling coil is configured so that an RFID tag attached to the second connector, when inserted into the second jack, will be positioned near the second pickup coupling structure; and wherein the first part of the coupling circuit includes the reader pickup coil.

Example 3 includes the adapter of any of the Examples 1-2, further comprising at least one clip to hold the adapter in a patch panel. Example 4 includes the adapter of any of the Examples 1-3, wherein the adapter comprises a fiber optic adapter, wherein the first and second connectors comprises fiber optic connectors. Example 5 includes the adapter of any of the Examples 1-4, wherein the adapter is configured to be field removable.

Example 6 includes a patch panel system comprising: a panel in which openings are formed; and a plurality of adapters of any of the Examples 1-5 that are inserted into the openings in the panel.

Example 7 includes the patch panel system of Example 6, wherein the patch panel system is configured to be used in the outside plant of a telecommunications network. Example 8 includes the patch panel system of any of the Examples 6-7, further comprising an enclosure that is at least one of tamper-resistant and weather-resistant.

Example 9 includes a method comprising: inserting a first connector into the first jack at a first side of an adapter; inserting a second connector into the second jack at a second side of an adapter, wherein the adapter is configured to communicatively couple the first connector to the second connector; positioning a portable RFID reader near a first part of a coupling circuit, the first part of the coupling circuit associated with the first side of the adapter; and performing a localized read of both an RFID tag attached to the first connector inserted into the first jack of the adapter and an RFID tag attached to the second connector inserted into the second jack of the adapter while the portable RFID reader is positioned near the first part of the coupling circuit and using the coupling circuit to enhance a read range of the portable RFID reader when performing the localized read.

Example 10 includes the method of Example 9, wherein the coupling circuit comprises a first pickup coil, a second pickup coil, and a reader coil; wherein the first coupling coil is configured so that an RFID tag attached to the first connector, when inserted into the first jack, will be positioned near the first pickup coupling structure; wherein the second coupling coil is configured so that an RFID tag attached to the second connector, when inserted into the second jack, will be positioned near the second pickup coupling structure; and wherein the first part of the coupling circuit includes the reader pickup coil.

Example 11 includes the method of any of the Examples 9-10, wherein the adapter further comprises at least one clip to hold the adapter in a patch panel. Example 12 includes the method of any of the Examples 9-11, wherein the adapter comprises a fiber optic adapter, wherein the first and second connectors comprises fiber optic connectors. Example 13 includes the method of any of the Examples 9-12, wherein the adapter is configured to be field removable.

Example 14 includes the method of any of the Examples 9-13, wherein the adapter is inserted into an opening in a panel included in a patch panel system.

Example 15 includes the method of any of the Examples 9-14, wherein the method is used in an outside plant of a telecommunications network.

What is claimed is:

1. An adapter comprising:
   a first jack associated with a first side of the adapter and configured so that a first connector can be inserted into the first jack at the first side of the adapter;
   a second jack associated with a second side of the adapter and configured so that a second connector can be inserted into the second jack at the second side of the adapter, wherein the adapter is configured to communicatively couple the first connector to the second connector; and
   a coupling circuit configured so that a portable RFID reader can be positioned near a first part of the coupling circuit associated with the first side of the adapter in order to perform a localized read of both an RFID tag attached to the first connector inserted into the first jack of the adapter and an RFID tag attached to the second connector inserted into the second jack of the adapter, wherein the coupling circuit is used to enhance a read range of the portable RFID reader when performing the localized read.

2. The adapter of claim 1, wherein the coupling circuit comprises a first pickup coil, a second pickup coil, and a reader coil;
   wherein the first coupling coil is configured so that an RFID tag attached to the first connector, when inserted into the first jack, will be positioned near the first pickup coupling structure;
   wherein the second coupling coil is configured so that an RFID tag attached to the second connector, when inserted into the second jack, will be positioned near the second pickup coupling structure; and
   wherein the first part of the coupling circuit includes the reader pickup coil.

3. The adapter of claim 1, further comprising at least one clip to hold the adapter in a patch panel.

4. The adapter of claim 1, wherein the adapter comprises a fiber optic adapter, wherein the first and second connectors comprises fiber optic connectors.

5. The adapter of claim 1, wherein the adapter is configured to be field removable.

6. A patch panel system comprising: a panel in which openings are formed; and a plurality of adapters of claim 1 that are inserted into the openings in the panel.

7. The patch panel system of claim 6, wherein the patch panel system is configured to be used in the outside plant of a telecommunications network.

8. The patch panel system of claim 6, further comprising an enclosure that is at least one of tamper-resistant and weather-resistant.

9. A method comprising:
   inserting a first connector into the first jack at a first side of an adapter;
   inserting a second connector into the second jack at a second side of an adapter, wherein the adapter is configured to communicatively couple the first connector to the second connector;
   positioning a portable RFID reader near a first part of a coupling circuit, the first part of the coupling circuit associated with the first side of the adapter; and
   performing a localized read of both an RFID tag attached to the first connector inserted into the first jack of the adapter and an RFID tag attached to the second connector inserted into the second jack of the adapter while the portable RFID reader is positioned near the first part of the coupling circuit and using the coupling circuit to enhance a read range of the portable RFID reader when performing the localized read.

10. The method of claim 9, wherein the coupling circuit comprises a first pickup coil, a second pickup coil, and a reader coil;
    wherein the first coupling coil is configured so that an RFID tag attached to the first connector, when inserted into the first jack, will be positioned near the first pickup coupling structure;
    wherein the second coupling coil is configured so that an RFID tag attached to the second connector, when inserted into the second jack, will be positioned near the second pickup coupling structure; and
    wherein the first part of the coupling circuit includes the reader pickup coil.

11. The method of claim 9, wherein the adapter further comprises at least one clip to hold the adapter in a patch panel.

12. The method of claim 9, wherein the adapter comprises a fiber optic adapter, wherein the first and second connectors comprises fiber optic connectors.

13. The method of claim 9, wherein the adapter is configured to be field removable.

14. The method of claim 9, wherein the adapter is inserted into an opening in a panel included in a patch panel system.

15. The method of claim 9, wherein the method is used in an outside plant of a telecommunications network.

* * * * *